(12) United States Patent
Hayashi

(10) Patent No.: US 6,269,102 B1
(45) Date of Patent: Jul. 31, 2001

(54) BUS CONTROL DEVICE

(75) Inventor: Isamu Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/026,395

(22) Filed: Feb. 19, 1998

(30) Foreign Application Priority Data

Sep. 11, 1997 (JP) .................................................. 9-246698

(51) Int. Cl.[7] .................................................... G06F 13/28
(52) U.S. Cl. ............................................. 370/428; 710/27
(58) Field of Search ..................................... 370/438–440, 370/428, 429; 710/112, 129, 27

(56) References Cited

U.S. PATENT DOCUMENTS 5,448,558 * 9/1995 Gildea et al. ........................... 370/60
6,067,595 * 5/2000 Lindenstruth ......................... 710/129

FOREIGN PATENT DOCUMENTS 3-116350   5/1991   (JP) .
8-147236   6/1996   (JP) .

* cited by examiner

Primary Examiner—Melvin Marcelo
(74) Attorney, Agent, or Firm—Burns, Doane, Swecker & Mathis, LLP

(57) ABSTRACT

A data transfer controller (14) decides that both of a host bus (100) and a local bus (101) have been acquired by a bus interface LSI 1b by the fact that a host bus use permission GNTH from a host bus arbiter (2b) and a local bus use permission GNTL from a local bus arbiter (4) are both activated, in which case, the data transfer controller (14) controls a host bus DMA controller (12) and a local bus DMA controller (13) to make selectors SE1 and SE2 establish a connection between the host bus (100) and the local bus (101) through an inner data path (11b) having no buffer. This configuration improves data transfer rate through the host bus (100) and the local bus (101).

20 Claims, 11 Drawing Sheets

BUS CONTROL DEVICE

BACKGROUND OF THE INVENTION

1. Field of the Invention

The present invention relates to a bus interface device.

2. Description of the Background Art

FIG. 11 is a block diagram showing a data processing system of an NIC (Network Interface Card) according to a background art. As the NIC, there is shown, for example, an ATMLAN board 1 (hereinafter referred to as a "board 1").

In the processing system, data transfer from a host memory 22 to a local memory 3 provided on the board 1 is performed through the following procedure.

Firstly, a host CPU 21 sends a source address SA, a destination address DA, and a data length DL of data to be transferred from the host memory 22, to a configuration register 15 provided on a bus interface LSI 1a in the board 1 through a buffer 2a provided on a host bus bridge 2. For convenience, these data transfers are shown by the arrows in the figure, but in practice, they are performed through a host bus 100.

From a host bus DMA controller 12 on the bus interface LSI 1a in the board 1, a request BQH to acquire the host bus 100 is transferred to a host bus arbiter 2b on the host bus bridge 2. The host bus arbiter 2b examines whether the host bus 100 may be acquired by the host bus DMA controller 12. If practicable, the host bus arbiter 2b sends a use permission GNTH of the host bus 100 to the host bus DMA controller 12. In practice, the request BQH and the use permission GNTH are also sent through the host bus 100.

The host bus DMA controller 12 which has acquired the host bus 100 sends the host memory 22 an output request RQ and the source address SA obtained from the configuration register 15 (actually through the host bus 100). Data stored in the source address SA is sent to a data transfer buffer 11a on the bus interface LSI 1a through the host bus 100.

When the data transfer buffer 11a is full, full signals FULL are sent to a local bus DMA controller 13 on the bus interface LSI 1a. The local bus DMA controller 13 sends a local bus arbiter 4 on the board 1 a request BQL to acquire a local bus 101. The local bus arbiter 4 examines whether the local bus 101 may be acquired by the local bus DMA controller 13. For example, it checks if the local bus 101 is already acquired by a protocol processor 5. If practicable, the local bus arbiter 4 sends a use permission GNIL of the local bus 101 to the local bus DMA controller 13. The local bus arbiter 4 may be provided on the bus interface LSI 1a.

The local bus DMA controller 13 which has acquired the local bus 101 sends the local memory 3 an input request WQ and the destination address DA obtained from the configuration register 15. Data stored in the data transfer buffer 11a are sequentially transferred to the local memory 3 through the local bus 101 and then held in the destination address DA.

Thus when data transfer from a host memory to a local memory is performed through a host bus and a local bus, the data transfer buffer 11a always causes delay in the background art. In addition, the host bus DMA controller 12 and the local bus DMA controller 13 operate independently, so that latency in bus acquisition occurs in both of the host bus and the local bus. This hinders improvement of data transfer rate.

SUMMARY OF THE INVENTION

According to a first aspect of the present invention, a bus control device intervening between first and second buses comprises: a first path and a second path whose data transfer latency is larger than that of the first path, one of which being selectively connected between the first and second buses; a first bus DMA controller for controlling the first bus; a second bus DMA controller for controlling the second bus; and a data transfer controller for controlling the first path to be connected between the first and second buses when the first bus DMA controller can acquire the first bus and the second bus DMA controller can acquire the second bus.

According to a second aspect of the present invention, in the bus control device of the first aspect, the first bus DMA controller sends a request to acquire the first bus to a first bus arbiter for arbitrating an entity that acquires the first bus, the second bus DMA controller sends a request to acquire the second bus to a second bus arbiter for arbitrating an entity that acquires the second bus, and the first and second bus arbiters send permissions to acquire the first and second buses, respectively, to the data transfer controller.

According to a third aspect of the present invention, the bus control device of the first aspect further comprises a configuration register for storing a data length of data to be transferred between the first and second buses.

According to a fourth aspect of the present invention, the bus control device of the first aspect further comprises a configuration register for storing a destination address of data to be transferred between the first and second buses.

According to a fifth aspect of the present invention, the bus control device of the first aspect further comprises a configuration register for storing information indicating a type of data to be transferred between the first and second buses.

According to a sixth aspect of the present invention, in the bus control device of the first aspect, the first path has no buffer and the second path has a buffer.

According to a seventh aspect of the present invention, in the bus control device of the sixth aspect, the data transfer controller receives a data length of data to be transferred between the first and second buses and, when the data length is larger than a given length, the second path is connected between the first and second buses even if the first and second bus DMA controllers can acquire the first and second buses, respectively.

According to an eighth aspect of the present invention, in the bus control device of the seventh aspect, the data transfer controller includes: a comparator for outputting a comparison signal that is activated when the data length is not larger than the given length; and logical circuits for ANDing the comparison signal, a first use permission signal indicating that the first bus DMA controller can acquire the first bus, and a second use permission signal indicating that the second bus DMA controller can acquire the second bus, thereby sending a control signal to the first and second bus DMA controllers.

According to a ninth aspect of the present invention, in the bus control device of the sixth aspect, the data transfer controller receives a destination address of data to be transferred between the first and second buses and, when the destination address is outside of a prescribed range, the second path is connected between the first and second buses even if the first and second bus DMA controllers can acquire the first and second buses, respectively.

According to a tenth aspect of the present invention, in the bus control device of the ninth aspect, the data transfer controller includes: a comparator for outputting a comparison signal that is activated when the destination address is in the prescribed range; and logical circuits for ANDing the comparison signal, a first use permission signal indicating that the first bus DMA controller can acquire the first bus, and a second use permission signal indicating that the second bus DMA controller can acquire the second bus, thereby sending a control signal to the first and second bus DMA controllers.

According to an eleventh aspect of the present invention, in the bus control device of the sixth aspect, the data transfer controller receives a type of data to be transferred between the first and second buses and, when the type is not a specified one, the second path is connected between the first and second buses even if the first and second bus DMA controllers can acquire the first and second buses, respectively.

According to a twelfth aspect of the present invention, in the bus control device of the sixth aspect, the data transfer controller includes: a comparator for outputting a comparison signal that is activated when information indicating the type of data has a value in a specified range; and logical circuits for ANDing the comparison signal, a first use permission signal indicating that the first bus DMA controller can acquire the first bus, and a second use permission signal indicating that the second bus DMA controller can acquire the second bus, thereby sending a control signal to the first and second bus DMA controllers.

According to a thirteenth aspect of the present invention, in the bus control device of the first aspect, when a first use permission signal indicating that the first bus DMA controller can acquire the first bus is activated and the second bus DMA controller outputs a request to acquire the second bus, the second bus is preferentially acquired by the second bus DMA controller.

According to a fourteenth aspect of the present invention, the bus control device of the thirteenth aspect further comprises a bus arbiter for arbitrating an entity that acquires the second bus, the bus arbiter receiving the first use permission signal and the request, and when the first use permission signal is activated, the bus arbiter preferentially specifies the second bus DMA controller as the entity that acquires the second bus, and outputs a second use permission signal indicating that the second bus DMA controller can acquire the second bus, to the data transfer controller.

According to a fifteenth aspect of the present invention, in the bus control device of the sixth aspect, after a given period of time from a state where the first and second buses can be acquired by the first and second bus DMA controllers, respectively, the data transfer controller controls the second path to be connected between the first and second buses even if the first and second bus DMA controllers can acquire the first and second buses, respectively.

According to the sixteenth aspect of the present invention, in the bus control device of the fifteenth aspect, the data transfer controllers includes: a first logical circuit for outputting an AND of a first use permission signal indicating that the first bus DMA controller can acquire the first bus and a second use permission signal indicating that the second bus DMA controller can acquire the second bus; a timer that activates its output for a given period of time after an output of the first logical circuit changes from a deactivation state to an activation state; and a second logical circuit for ANDing the output of the first logical circuit and the output of the timer and sending a control signal to the first and second bus DMA controllers.

In the bus control device of the first aspect, when first and second buses are both acquired, data transfer is performed using a first path having a smaller transfer latency. This, coupled with suppression of latency in bus acquisition, permits high-speed data transfer.

In the bus control device of the second aspect, the absence of buffer in the first path improves data transfer rate. The presence of buffer in the second path enables that, when the first or second bus father away from a data sending side is not acquired by the first or second bus DMA controller, respectively, data are temporarily held in a buffer by using the bus closer to the data sending side and, thereafter, when the bus father away from the data sending side is acquired, the data held in the buffer is transferred to that bus.

In the bus control device of the third aspect, when a data length of data to be transferred is large, it is avoided that the first and second buses are both occupied for a long period, thus leading to the effects of the second aspect without degrading the performance of the whole system.

In the bus control device of the fourth aspect, when a destination address of data to be transferred is in a given range, the data is considered as having high urgency so that the data is transferred through the first path. When it is outside of the given range, data transfer is performed through the second path. Thus, for data transfer with low urgency, the first and second buses are not both occupied, causing no degradation in the performance of the whole system. For data transfer with high urgency, rapid data transfer is available.

In the bus control device of the fifth aspect, when a type of data to be transferred is a specified one, it is possible to decide that data transfer urgency is high, resulting in the effects of the fourth aspect.

In the bus control device of the sixth aspect, when the first bus can be acquired by the first bus DMA controller, the second bus can be preferentially acquired by the second bus DMA controller. This permits further reduction of latency in bus acquisition and rapid data transfer.

In the bus control device of the seventh aspect, it is avoided that the first and second buses are both occupied for a long period, thus leading to the effects of the second aspect without degrading the performance of the whole system.

An object of the present invention is to provide a technique of improving a data transfer rate by establishing cooperation between a host bus DMA controller and a local bus DMA controller.

These and other objects, features, aspects and advantages of the present invention will become more apparent from the following detailed description of the present invention when taken in conjunction with the accompanying drawings.

DESCRIPTION OF THE PREFERRED EMBODIMENTS

Japanese Patent Application Laid-Open. No. 3-116350 (1991) discloses a technique in which a type or amount of data to be transferred is detected to switch two types of buses provided in parallel. Japanese Patent Application Laid-Open No. 8-147236 (1996) discloses a technique in which a data length is detected to switch two types of buses provided in parallel. But, unlike these techniques, a technique for use in the present invention is directed to decide whether it is possible to acquire two buses that are connected in series to two types of paths provided in parallel. When it is possible, a specified one of the two paths is selected and then connected in series to the two buses. Hereinafter, the technique will be described in detail.

The First Preferred Embodiment

Figure 1:
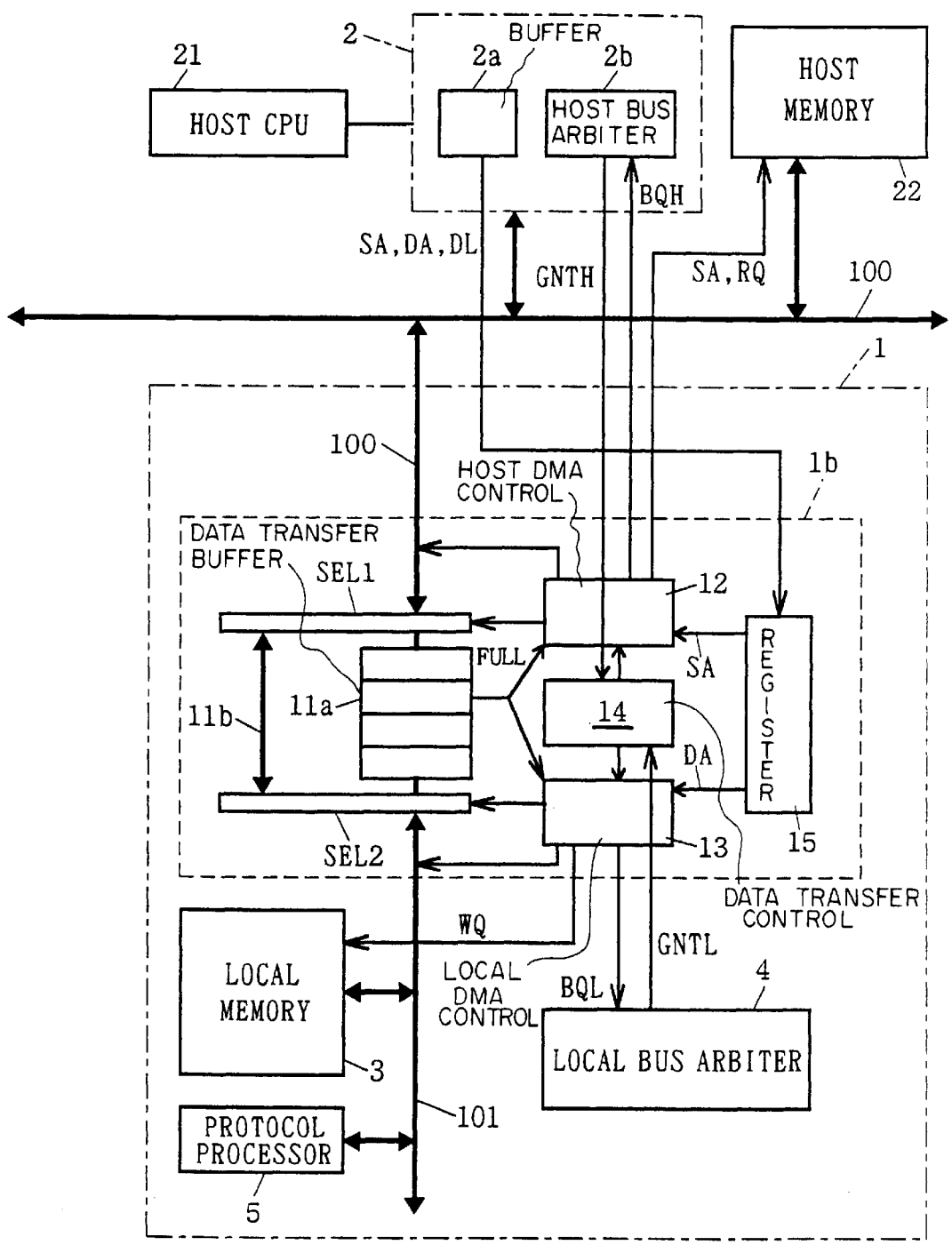
FIG. 1 is a block diagram showing a first preferred embodiment of the present invention.

FIG. 1 is a block diagram showing a configuration of a first preferred embodiment of the present invention. As in a configuration shown in FIG. 11, a host bus bridge 2, a host memory 22, and a board 1 are connected to a host bus 100.

The host bus bridge 2 has a buffer 2a and a host bus arbiter 2b. The buffer 2a temporarily stores data from a host CPU 21 connected to the host bus bridge 2. Examples of the data include a source address SA, a destination address DA, and a data length DL of data to be transferred from the host memory 22.

The board 1 is connected with the host bus 100 and provided with a local bus 101. The host bus 100 is connected to the local bus 101 through a bus interface LSI 1b. In addition to the bus interface LSI 1b, a local memory 3 and a protocol processor 5 are connected to the local bus 101, as in the configuration shown in FIG. 11.

Figure 11:
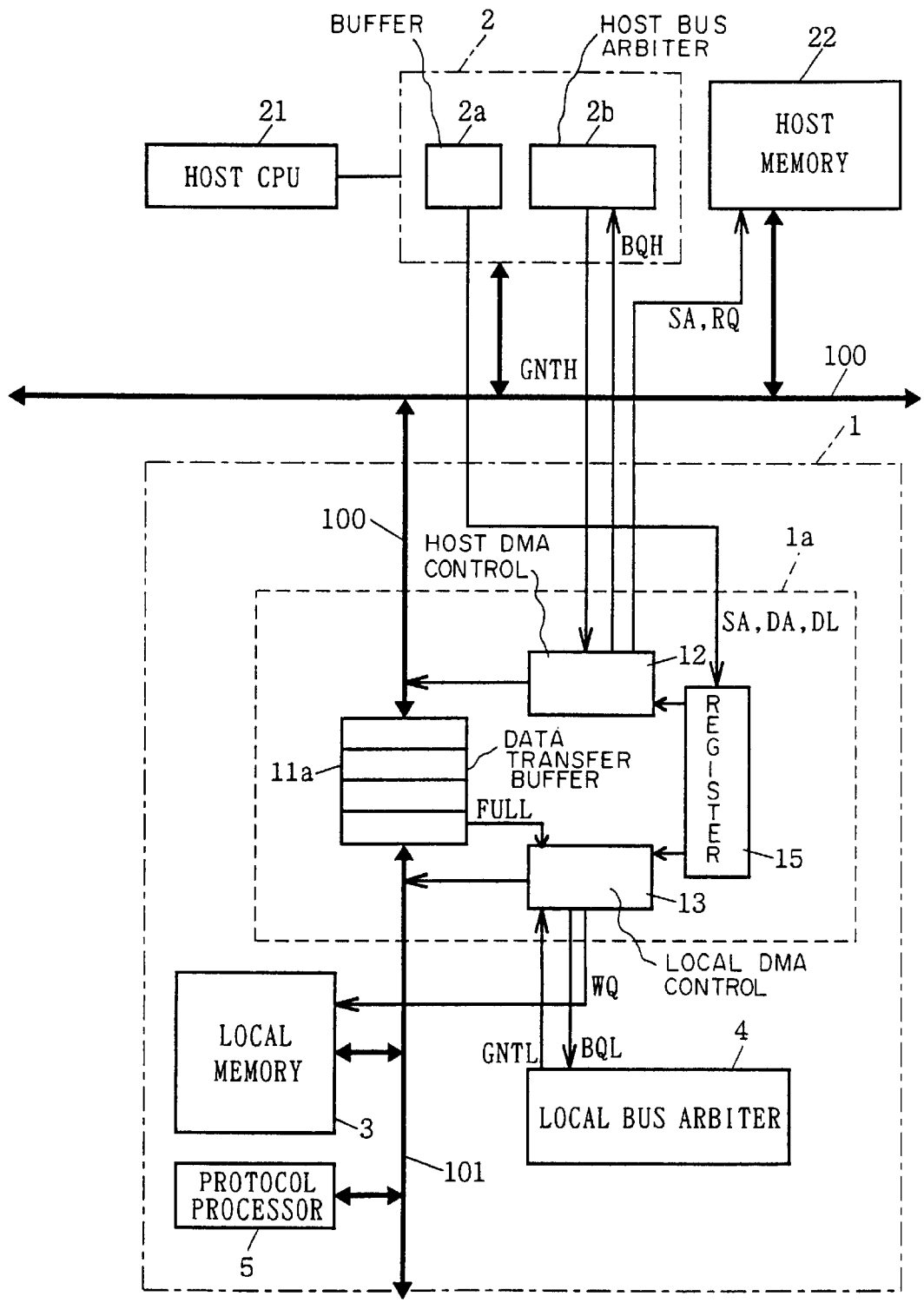
FIG. 11 is a block diagram showing a background art.

The bus interface LSI 1b has a data transfer buffer 11a, a host bus DMA controller 12, a local bus DMA controller 13, and a configuration register 15, as shown in FIG. 11, and further includes selectors SEL1, SEL2, an inner data path 11b, and a data transfer controller 14.

The selector SEL1 selectively connects the host bus 100 to either of the data transfer buffer 11a and the inner data path 11b, under control of the host bus DMA controller 12. The selector SEL2 connects the local bus 101 to either of the data transfer buffer 11a and the inner data path 11b, either of which is to be selected by the selector SEL1, under control of the local bus DMA controller 13. Partitions of the data transfer buffer 11a indicates that plural latches constituting the data transfer buffer 11a are connected in series between the selectors SEL1 and SEL2.

In this system, data transfer from the host memory 22 to the local memory 3 on the board 1 is performed through the following procedure.

As in the background art, a source address SA, a destination address DA, and a data length DL are sent to the configuration register 15. A request BQH to acquire the host bus 100 is transferred from the host bus DMA controller 12 to the host bus arbiter 2b. The host bus arbiter 2b, however, send a use permission GNTH, not to the host bus DMA controller 12, but to the data transfer controller 14. The data transfer controller 14 is connected to the host bus 100, thereby the use permission GNTH is transferred to the data transfer controller 14 through the host bus 100, although this is not shown in the figure for simplicity.

Meanwhile, the local bus DMA controller 13 transfers a request BQL to acquire the local bus 101 to the local bus arbiter 4. The local bus arbiter 4, however, sends a use permission GNTL, not to the local bus DMA controller 13, but to the data transfer controller 14.

It is noted that the local bus arbiter 4 may be provided on the bus interface LSI 1b or may be connected to the local bus 101 so that a request BQL and a use permission GNTL are transferred through the local bus 101. In the latter, the data transfer controller 14 is also connected to the local bus 101.

The data transfer controller 14 decides whether the bus interface LSI 1b has acquired both of the host bus 100 and the local bus 101, based on the use permissions GNTH and GNTL. When decided that both buses have been acquired, the data transfer controller 14 controls the host bus DMA controller 12 and the local bus DMA controller 13 to make the selectors SE1 and SE2 select the inner data path 11b. When decided that the local bus 101 has not been acquired, the data transfer controller 14 controls the controllers 12 and 13 to make the selectors SE1 and SE2select the data transfer buffer 11a . This decision on bus acquisition is readily implemented by using logical processing to the use permissions GNTH and GNTL. Assume that as to whether use permissions GNTH and GNTL are acquired or not are represented by "H" or "L", respectively. It is therefore possible to decide whether both of the host bus 100 and the local bus 101 have been acquired or not, depending on the fact that an AND of use permissions GNTH and GNTL is "H" or "L".

As in the operation of the background art, the host bus DMA controller 12 sends the host memory 22 an output request RQ and a source address SA obtained from the configuration register 15, and the local bus DMA controller 13 sends the local memory 3 an input request WQ and a destination address DA obtained from the configuration register 15.

Since in this preferred embodiment data transfer is performed as previously described, when both buses are acquired, both are directly connected with the inner data path 11b without employing the data transfer buffer 11a. Thus, data delay due to buffer and latency in bus acquisition are suppressed, improving data transfer rate. When either of these buses is not acquired, particularly when the local bus 101 is not acquired, data to be transferred are temporarily stored in the data transfer buffer 11a. Thereafter, when the local bus 101 is acquired, the data held in the data transfer buffer 11a are sent to the local bus 101.

Data transfer from the local memory 3 to the host memory 22 is also possible. In this case, when the host bus 100 has not been acquired, the SEL1 and SEL2 are controlled so as to select the data transfer buffer 11a. When the data transfer buffer 11a is selected and its storage capacity is full, signals FULL for stopping input to the data transfer buffer 11a are sent to the host bus DMA controller 12 and the local bus DMA controller 13, respectively. If the board 1 only functions as a transfer destination side, the signals FULL may be sent only to the local bus DMA controller 13. Conversely, the board 1 only functions as a transfer origin side, the FULL may be sent only to the host bus DMA controller 12.

The present invention is applicable not only to data transfer from the host memory 22 but also to communication data whose source address SA is not specified or a data length DL is obscure. This is because the selectors SEL1 and SEL2 operate based on whether the host bus 100 and the local bus 101 have been acquired, even if the aforesaid data are not specified in the host CPU21, the host bus DMA controller 12, or the local bus DMA controller 13. Data from the selector SEL2 are processed by the protocol processor 5.

Further, the board 1 may function as a sending source of communication data. In this case, the protocol processor 5 sends data in a given format to a selector SEL2.

The Second Preferred Embodiment

Figure 2:
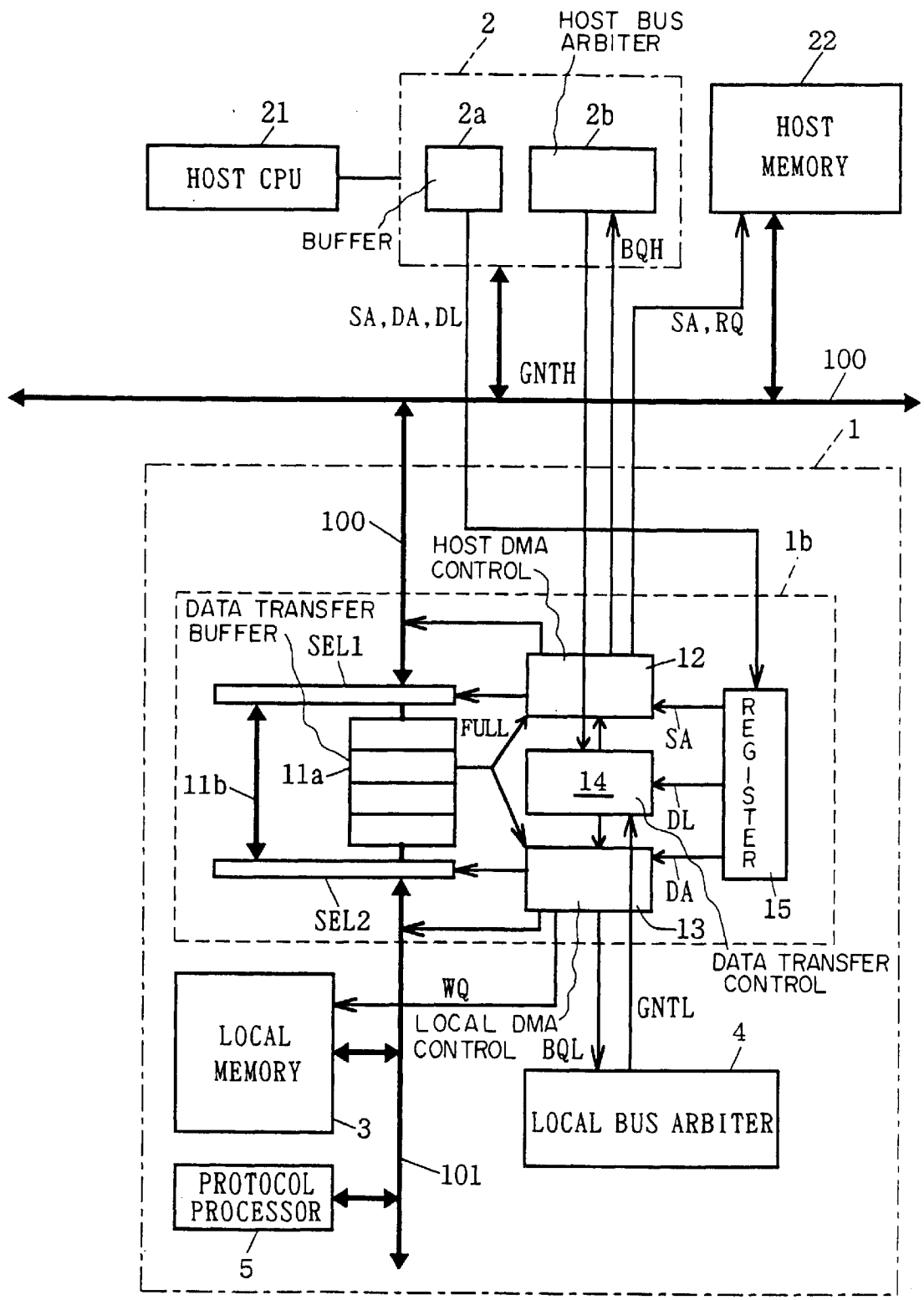
FIG. 2 is a block diagram showing a second preferred embodiment of the present invention.

FIG. 2 is a block diagram showing a configuration of a second preferred embodiment of the present invention. The configuration of FIG. 2 is the same as that of FIG. 1, except that a data length DL from a configuration register 15 is input to the data transfer controller 14.

Even when use permissions GNTH and GNTL are represented by "H", which indicates permission to acquire bus, if a data length DL is larger than a prescribed length DLO, the data transfer controller 14 controls a host bus DMA controller 12 and a local bus DMA controller 13 to make selectors SE1 and SE2 select a data transfer buffer 11a instead of an inner data path 11b.

Figure 3:
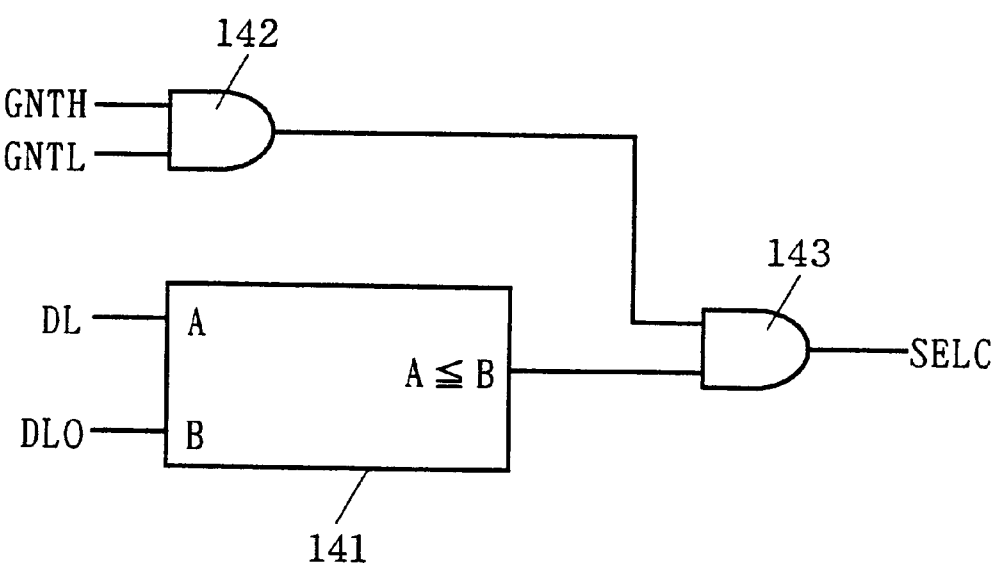
FIG. 3 is a circuit diagram showing the second preferred embodiment of the present invention.

FIG. 3 is a circuit diagram showing a configuration of a data transfer controller 14. A comparator 141 compares inputted data length DL and prescribed length DLO, to output a comparison signal. The comparison signal is "H" when the former is not larger than the latter. An AND gate 143 ANDs the comparison signal and the logical product of use permissions GNTH and GNTL obtained by an AND gate 142, to output control signals SELC. The control signals SELC are sent to the host bus DMA controller 12 and the local bus DMA controller 13, respectively. The inner data path 11b or the data transfer buffer 11a is selected depending on whether the control signals SELC is represented by "H" or "L". Thus, the data transfer controller 14 can be implemented with a simple configuration.

When the data transfer buffer 11a is selected, data to be transferred are held therein. As a result, at least either of the host bus 100 and the local bus 101 is not required to be occupied by the board 1.

Thus in this preferred embodiment, when a data length DL of data to be transferred is large, the data are transferred through the data transfer buffer 11a. This prevents the board 1 from occupying both of the host bus 100 and the local bus 101 for a long period, leading to the same effects as in the first preferred embodiment without degrading the performance of the whole system.

The Third Preferred Embodiment

Figure 4:
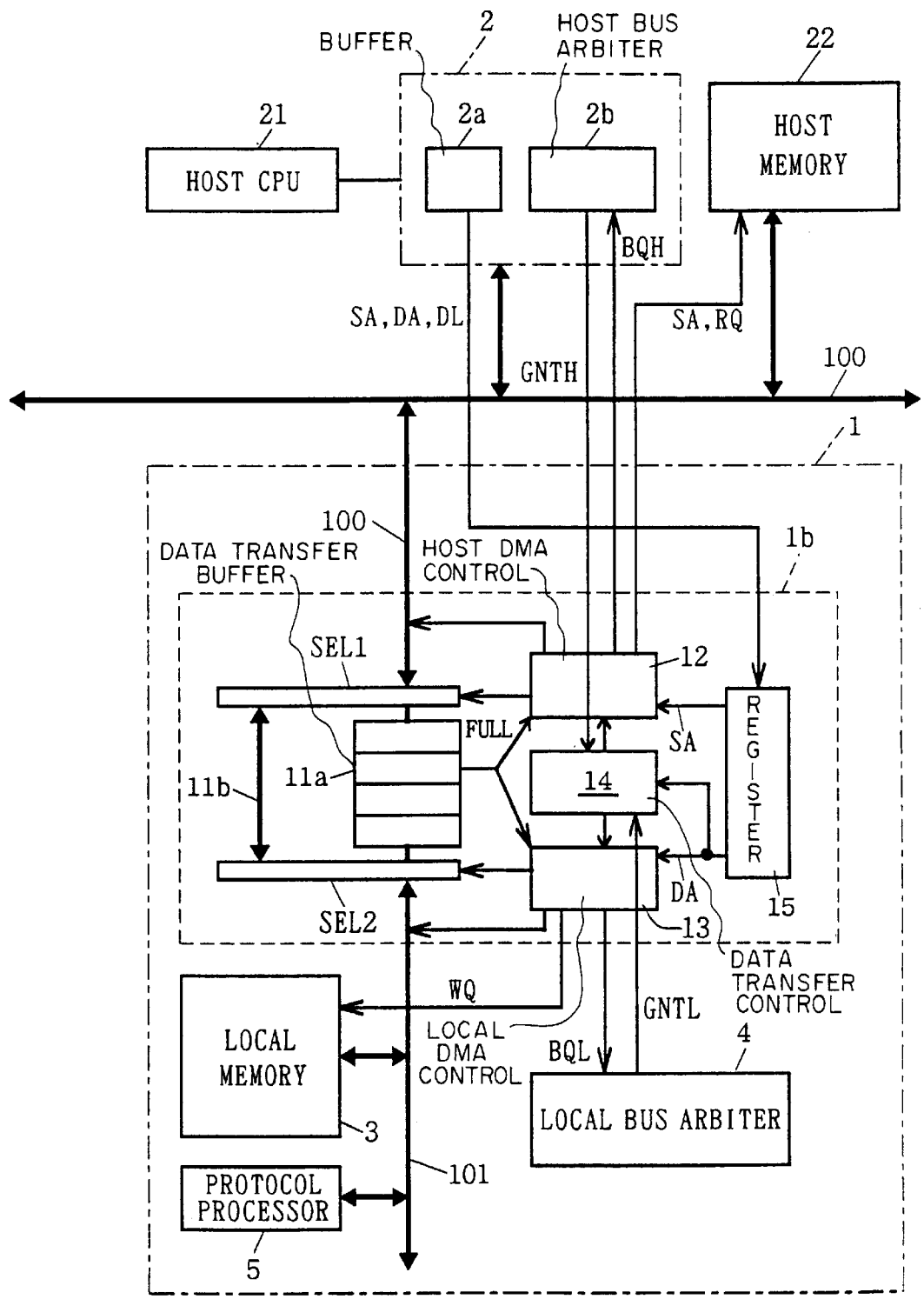
FIG. 4 is a block diagram showing a third preferred embodiment of the present invention.

FIG. 4 is a block diagram showing a configuration of a third preferred embodiment of the present invention. The configuration of FIG. 4 is the same as that of FIG. 1, except that a destination address DA from a configuration register 15 is input to a data transfer controller 14.

Even when use permissions GNTH and GNTL are represented by "H", which indicates permission to acquire bus, if a destination address DA is outside of a prescribed address range, the data transfer controller 14 controls a host bus DMA controller 12 and a local bus DMA controller 13 to make selectors SE1 and SE2 select a data transfer buffer 11a instead of an inner data path 11b.

Figure 5:
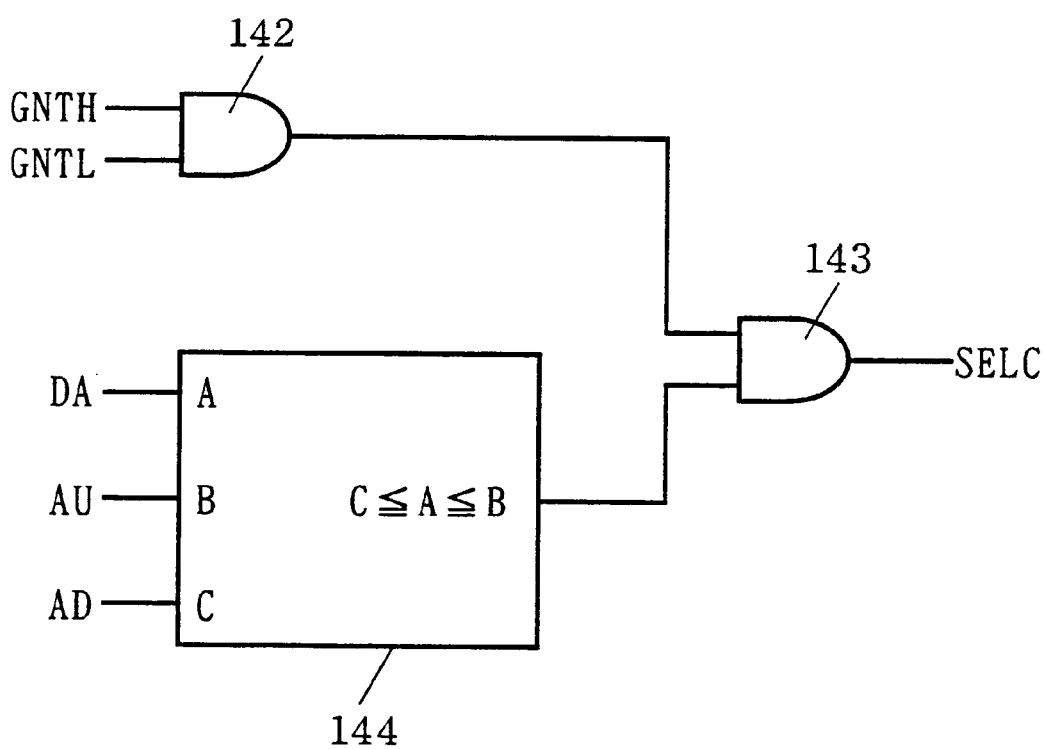
FIG. 5 is a circuit diagram showing the third preferred embodiment of the present invention.

FIG. 5 is a circuit diagram showing a configuration of a data transfer controller 14. A comparator 144 compares destination address DA with an upper limit AU and lower limit AD of a prescribed address range, to output a comparison signal. The comparison signal is "H" when AD<DA<AU is satisfied. An AND gate 143 ANDs the comparison signal and the logical product of use permissions GNTH and GNTL obtained by an AND gate 142, to output control signals SELC.

In this preferred embodiment, when a destination address DA of data to be transferred is in a prescribed range, the data is considered as having high urgency, so that the data is transferred through the inner data path 11b. When it is outside of that range, data transfer is performed through the data transfer buffer 11a. Thus, for data transfer with low urgency, it is avoided that both of a host bus 100 and a local bus 101 are occupied, causing no degradation in the performance of the whole system. For data transfer with high urgency, rapid data transfer is available.

In the meantime, control signals SELC and an output of the comparator 141 shown in FIG. 3 may be further ANDed, thereby preventing the performance of the whole system from decreasing in the same manner as in the second preferred embodiment.

The Fourth Preferred Embodiment

Figure 6:
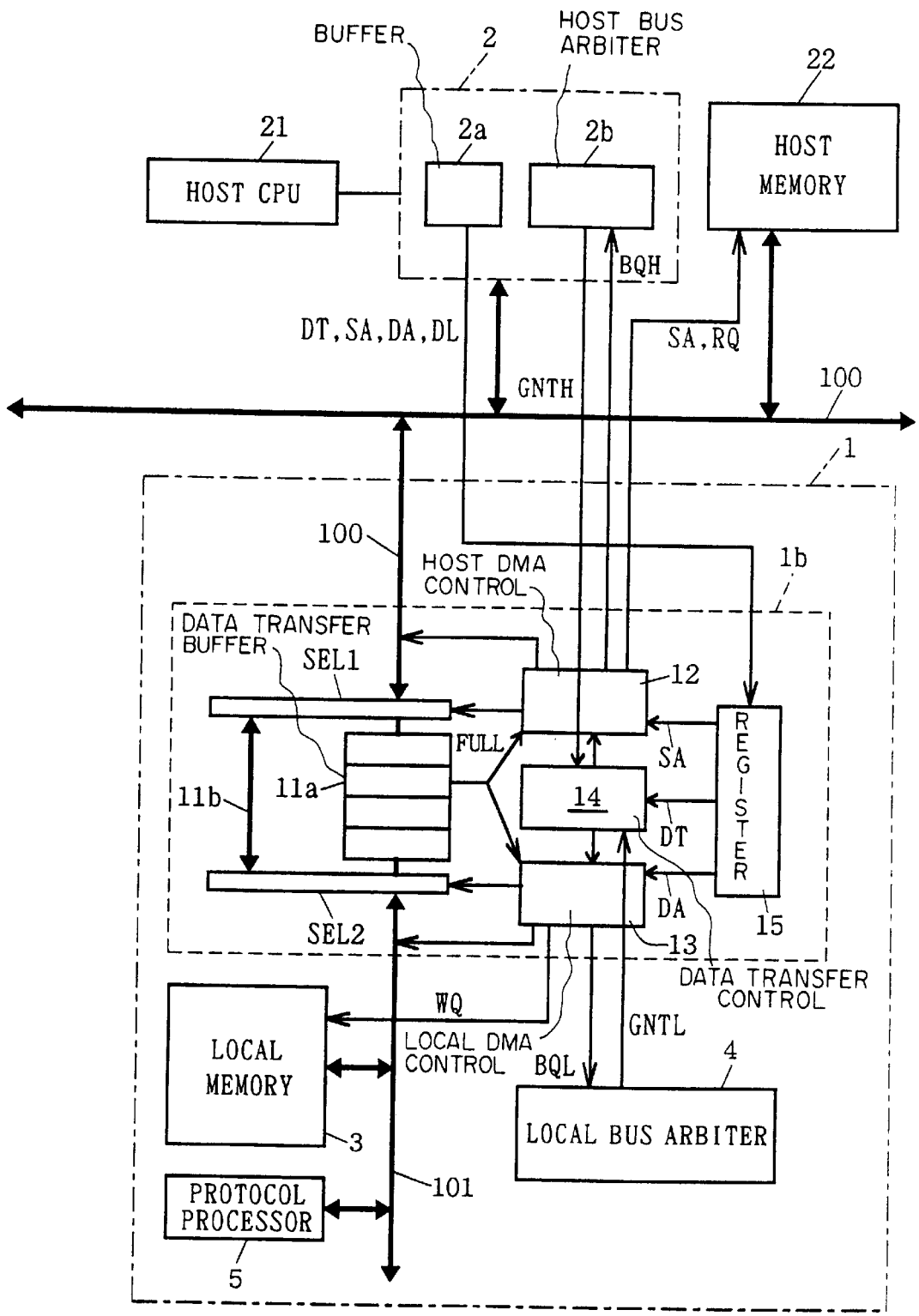
FIG. 6 is a block diagram showing a fourth preferred embodiment of the present invention.

FIG. 6 is a block diagram showing a configuration of a fourth preferred embodiment of the present invention. The configuration of FIG. 6 is the same as that of FIG. 1, except that a type of data DT from a configuration register 15 is input to a data transfer controller 14. The type of data DT is transferred from a buffer 2a and then stored in the configuration register 15, together with a source address SA, a destination address DA, and a data length DL, for example.

Even when use permissions GNTH and GNTL are represented by "H", which indicates permission to acquire bus, if the type of data DT is not a specified one, the data transfer controller 14 controls a host bus DMA controller 12 and a local bus DMA controller 13, to make selectors SE1 and SEL2 select a data transfer buffer 11a instead of an inner data path 11b.

Figure 7:
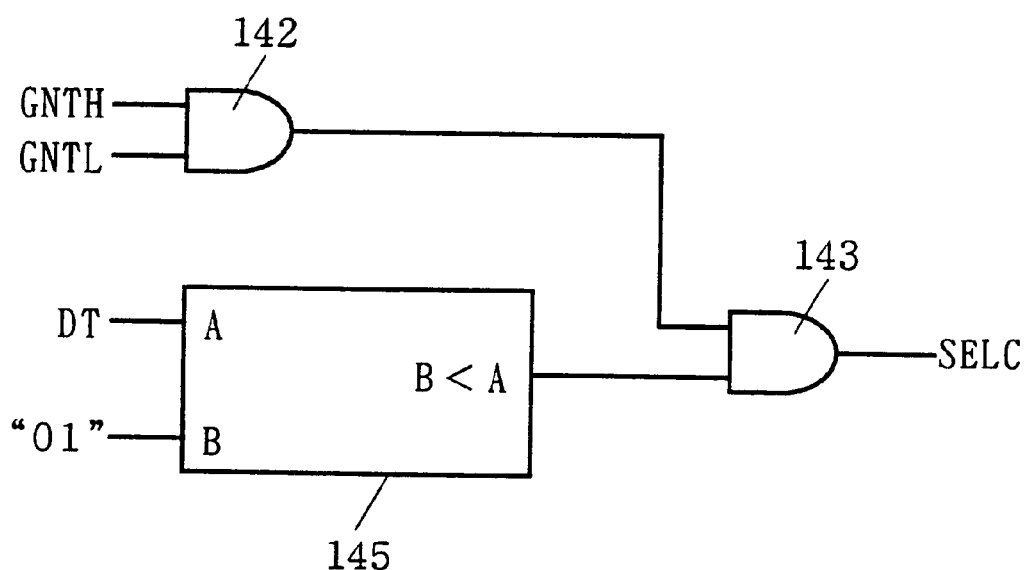
FIG. 7 is a circuit diagram showing the fourth preferred embodiment of the present invention.

FIG. 7 is a circuit diagram showing a configuration of a data transfer controller 14. Assume that the type of data DT is two-bit signals and data of a specified type is represented by a value "10" or "11". A comparator 145 compares inputted type of data DT and a value "01", to output a comparison signal which is "H" when the DT is larger than "01". An AND gate 143 ANDs the comparison signal and the logic product of use permission GNTH and GNTL obtained by an AND gate 142, to output control signals SELC.

In this preferred embodiment, when a type of data DT of data to be transferred is a specified one, the data is considered as having high urgency, so that the data is transferred through the inner data path 11b. When it is not a specified one, data transfer is performed through the transfer buffer 11a. This results in the same effects as in the third preferred embodiment.

In addition, AND of the control signals SELC, an output of the comparator 141 in FIG. 3, and an output of the comparator 144 in FIG. 5, enables to prevent reduction in the performance of the whole system as in the second preferred embodiment, and enables to decide urgency by using a destination address DA as in the third preferred embodiment.

The Fifth Preferred Embodiment

Figure 8:
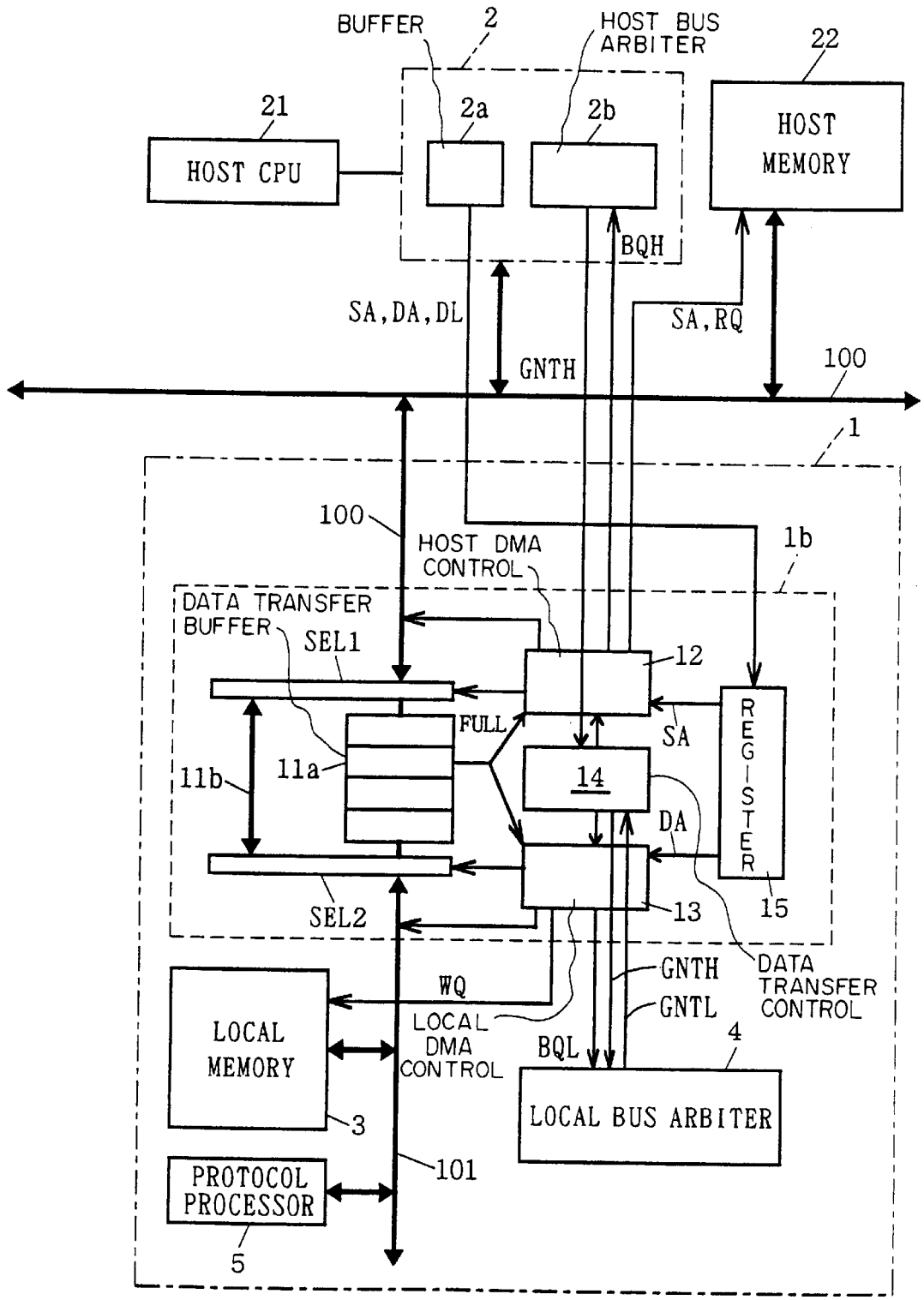
FIG. 8 is a block diagram showing a fifth preferred embodiment of the present invention.

FIG. 8 is a block diagram showing a configuration of a fifth preferred embodiment of the present invention. The configuration of FIG. 8 is the same as that of FIG. 1, except that a data transfer controller 14 tells a local bus arbiter 4 as to whether a board 1 has acquired a host bus 100. For example, the data transfer controller 14 transfers a local bus arbiter 4 a use permission GNTH from a host bus arbiter 2b.

When the use permission GNTH is represented by "H", indicating that a bus interface LSI 1b can acquire the host bus 100, the local bus arbiter 4 preferentially permits to use the local bus 101 in response to a request BQL from a local bus DMA controller 13. It is generally known that bus arbiters preferentially permit to use bus in response to a bus acquisition request from a prescribed bus master, under a specific conditions.

In this preferred embodiment, when the host bus 100 is acquired by the board 1, the local bus 101 is preferentially acquired by the bus interface LSI 1b. This leads to further reduction of latency in bus acquisition and enables data transfer through the host bus 100 to be rapidly performed through the inner data path 11b.

The second to four preferred embodiments can be utilized in the fifth preferred embodiment. In any case, data of high urgency can be stored more rapidly.

The Sixth Preferred Embodiment

Figure 9:
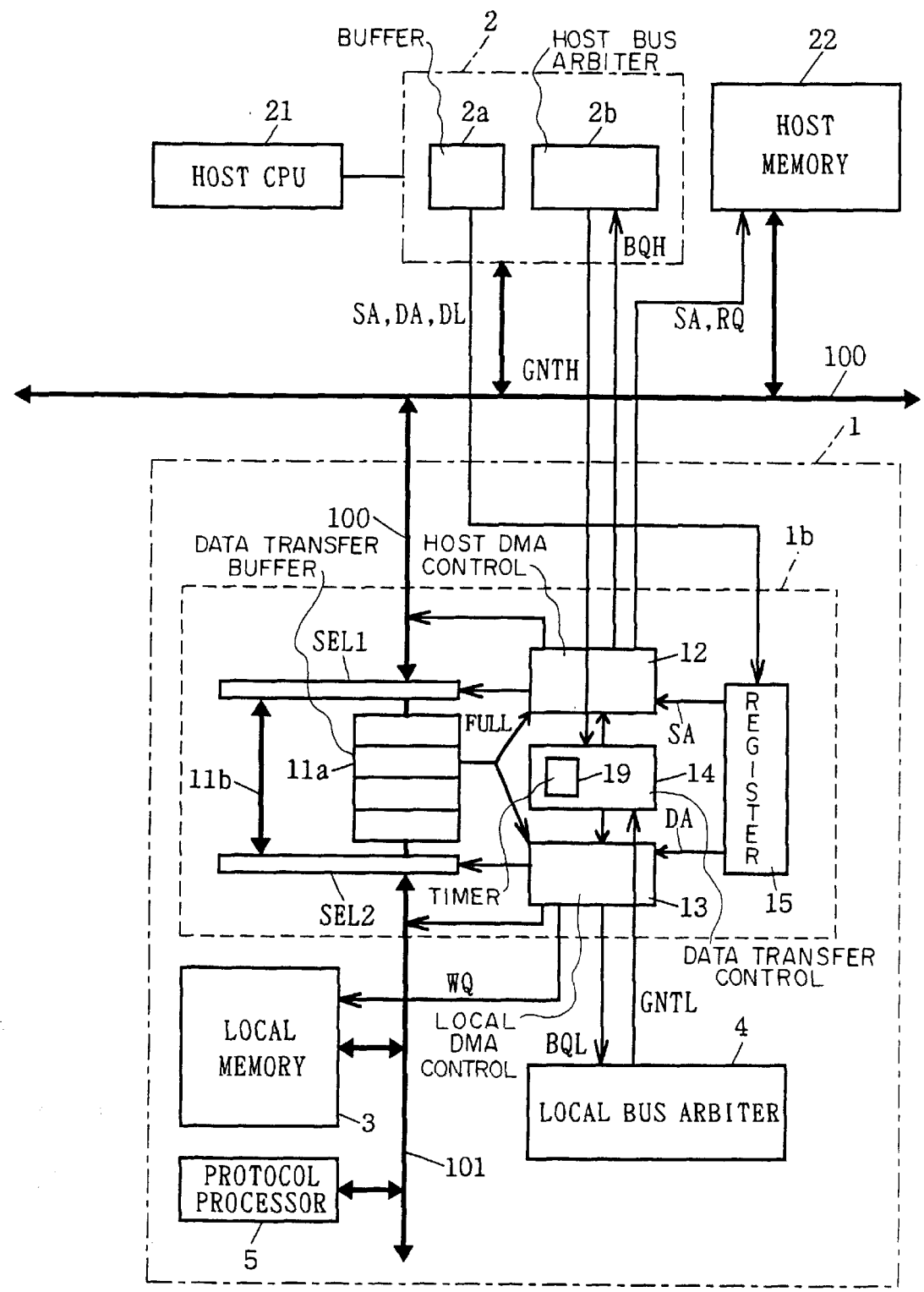
FIG. 9 is a block diagram showing a sixth preferred embodiment of the present invention.
Figure 10:
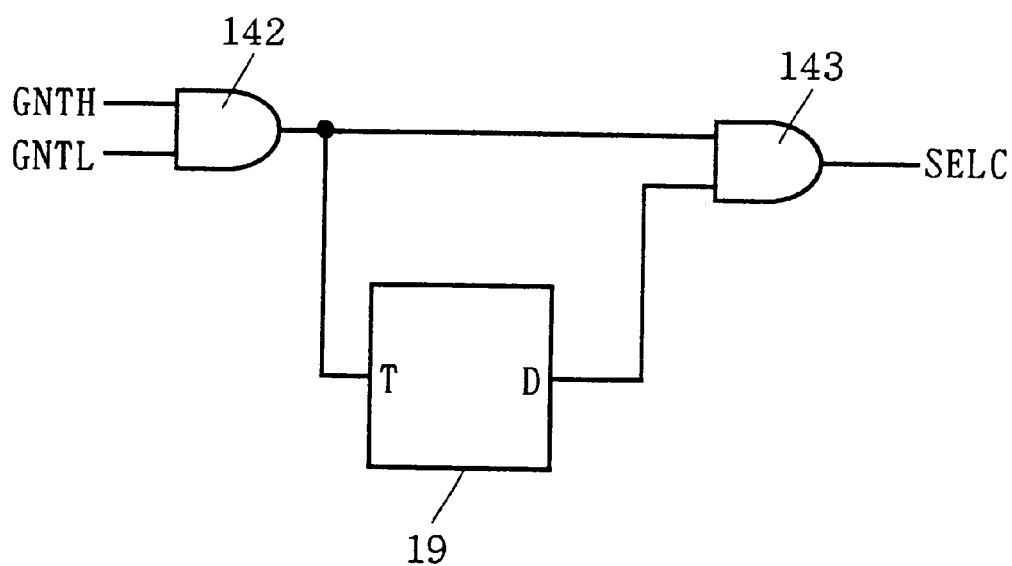
FIG. 10 is a circuit diagram showing the sixth preferred embodiment of the present invention.

FIG. 9 is a block diagram showing a configuration of a sixth preferred embodiment of the present invention. The configuration of FIG. 9 is the same as that of FIG. 1, except that a data transfer controller 14 has a timer 19. FIG. 10 is a circuit diagram showing a configuration of a data transfer controller 14. The timer 19 is implemented by a one-shot multivibrator, for example. The timer 19 receives an output of the AND gate 142, i.e., the logical product of use permissions GNTH and GNTL, as a trigger signal, and outputs "H" signals for a given period of time from the rise of the trigger signal. An AND gate 143 ANDs the output of the AND gate 142 and an output of the timer 19, to output control signals SELC.

In this preferred embodiment, when a host bus 100 and a local bus 101 are both acquired, rapid data transfer is performed through an inner data path 11b. But, for data of large size, a bus interface LSI 1b does not occupy both of the host bus 100 and the local bus 101 for a long period and, after a given period of time set by the timer 19, data transfer through the inner data path 11b is changed to data transfer through a data transfer buffer 11a.

It is therefore possible to prevent both of the host bus 100 and the local bus 101 from being occupied for a period of time longer than a period of time set by the timer 19, leading to the same effects as in the first preferred embodiment without degrading the performance of the whole system.

This preferred embodiment can be combined with other preferred embodiments.

While the invention has been shown and described in detail, the foregoing description is in all aspects illustrative and not restrictive. It is therefore understood that numerous other modifications and variations can be devised without departing from the scope of the invention.

I claim:

1. A bus control device intervening between first and second buses comprising:
   a first path and a second path whose data transfer latency is larger than that of said first path, one of which being selectively connected between said first and second buses;
   a first bus DMA controller for controlling said first bus;
   a second bus DMA controller for controlling said second bus; and
   a data transfer controller for controlling said first path to be connected between said first and second buses when said first bus DMA controller is permitted to acquire said first bus and said second bus DMA controller is permitted to acquire said second bus.

2. The bus control device of claim 1,
   wherein said first bus DMA controller sends a request to acquire said first bus to a first bus arbiter for arbitrating an entity that acquires said first bus; p1 said second bus DMA controller sends a request to acquire said second bus to a second bus arbiter for arbitrating an entity that acquires said second bus; and
   said first and second bus arbiters send permissions to acquire said first and second buses, respectively, to said data transfer controller.

3. The bus control device of claim 1, further comprising a configuration register for storing a data length of data to be transferred between said first and second buses.

4. The bus control device of claim 1, further comprising a configuration register for storing a destination address of data to be transferred between said first and second buses.

5. The bus control device of claim 1, further comprising a configuration register for storing information indicating a type of data to be transferred between said first and second buses.

6. The bus control device of claim 1, wherein said first path has no buffer and said second path has a buffer.

7. The bus control device of claim 6, wherein said data transfer controller receives a data length of data to be transferred between said first and second buses and, when said data length is larger than a given length, said second path is connected between said first and second buses even if said first and second bus DMA controllers can acquire said first and second buses, respectively.

8. The bus control device of claim 7, wherein said data transfer controller includes:
   a comparator for outputting a comparison signal that is activated when said data length is not larger than said given length; and
   logical circuits for ANDing said comparison signal, a first use permission signal indicating that said first bus DMA controller can acquire said first bus, and a second use permission signal indicating that said second bus DMA controller can acquire said second bus, thereby sending a control signal to said first and second bus DMA controller.

9. The bus control device of claim 6, wherein said data transfer controller receives a destination address of data to be transferred between said first and second buses and, when said destination address is outside of a prescribed range, said second path is connected between said first and second buses even if said first and second bus DMA controllers can acquire said first and second buses, respectively.

10. The bus control device of claim 9, wherein said data transfer controller includes:
    a comparator for outputting a comparison signal that is activated when said destination address is in said prescribed range; and
    logical circuits for ANDing said comparison signal, a first use permission signal indicating that said first bus DMA controller can acquire said first bus, and a second use permission signal indicating that said second bus DMA controller can acquire said second bus, thereby sending a control signal to said first and second bus DMA controllers.

11. The bus control device of claim 6, wherein said data transfer controller receives a type of data to be transferred between said first and second buses and, when said type is not a specified one, said second path is connected between said first and second buses even if said first and second bus DMA controllers can acquire said first and second buses, respectively.

12. The bus control device of claim 11, wherein said data transfer controller includes:
   a comparator for outputting a comparison signal that is activated when information indicating said type of data has a value in a specified range; and
   logical circuits for ANDing said comparison signal, a first use permission signal indicating that said first bus DMA controller can acquire said first bus, and a second use permission signal indicating that said second bus DMA controller can acquire said second bus, thereby sending a control signal to said first and second bus DMA controllers.

13. The bus control device of claim 1, wherein, when a first use permission signal indicating that said first bus DMA controller can acquire said first bus is activated and said second bus DMA controller outputs a request to acquire said second bus, said second bus is preferentially acquired by said second bus DMA controller.

14. The bus control device of claim 13, further comprising a bus arbiter for arbitrating an entity that acquires said second bus, said bus arbiter receiving said first use permission signal and said request, and wherein, when said first use permission signal is activated, said bus arbiter preferentially specifies said second bus DMA controller as said entity that acquires said second bus, and outputs a second use permission signal indicating that said second bus DMA controller can acquire said second bus, to said data transfer controller.

15. The bus control device of claim 6, wherein, after a given period of time from a state where said first and second buses can be acquired by said first and second bus DMA controllers, respectively, said data transfer controller controls said second path to be connected between said first and second buses even if said first and second bus DMA controllers can acquire said first and second buses, respectively.

16. The bus control device of claim 15, wherein said data transfer controllers includes:
   a first logical circuit for outputting an AND of a first use permission signal indicating that said first bus DMA controller can acquire said first bus and a second use permission signal indicating that said second bus DMA controller can acquire said second bus;
   a timer that activates its output for a given period of time after an output of said first logical circuit changes from a deactivation state to an activation state; and
   a second logical circuit for ANDing said output of said first logical circuit and said output of said timer and sending a control signal to said first and second bus DMA controllers.

17. A bus control device intervening between first and second buses comprising:
   a first path and a second path, data transfer latency of said second path being larger than that of said first path, one of said first and second paths being selectively connected between said first and second buses; and
   a data transfer controller for controlling said first path to be connected between said first and second buses when said first and said second buses are permitted to be acquired.

18. The bus control device of claim 17 further comprising:
   a first bus DMA controller for acquiring said first bus; and
   a second bus DMA controller for acquiring said second bus.

19. A bus control device intervening between first and second buses comprising:
   a first path;
   a second path whose data transfer latency is larger than that of said first path, one of said first and second paths being selectively connected between said first and second buses; and
   a data transfer controller for controlling said second path to be connected between said first and second buses when either of said first and said second buses are not acquired.

20. The bus control device of claim 19 further comprising:
   a first bus DMA controller for acquiring said first bus; and
   a second bus DMA controller for acquiring said second bus.

* * * * *